US009994185B2

United States Patent
Deng et al.

(10) Patent No.: US 9,994,185 B2
(45) Date of Patent: Jun. 12, 2018

(54) VEHICLE SIDE AIR CURTAIN WITH TETHER INCLUDING A HOLE

(71) Applicant: Ford Global Technologies, LLC, Dearborn, MI (US)

(72) Inventors: Zhibing Deng, Northville, MI (US); Krishnakanth E. Aekbote, Novi, MI (US); Joseph Edward Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/244,182

(22) Filed: Aug. 23, 2016

(65) Prior Publication Data
US 2018/0056919 A1    Mar. 1, 2018

(51) Int. Cl.
*B60R 21/232*    (2011.01)
*B60R 21/2338*    (2011.01)
*B60R 21/213*    (2011.01)

(52) U.S. Cl.
CPC ......... *B60R 21/232* (2013.01); *B60R 21/213* (2013.01); *B60R 21/2338* (2013.01); *B60R 2021/23382* (2013.01)

(58) Field of Classification Search
CPC . B60R 21/232; B60R 21/2338; B60R 21/213; B60R 2021/23382
See application file for complete search history.

(56) References Cited

U.S. PATENT DOCUMENTS

| 5,845,935 | A | 12/1998 | Enders et al. | |
|---|---|---|---|---|
| 6,364,348 | B1 * | 4/2002 | Jang | B60R 21/201 280/730.2 |
| 6,450,529 | B1 * | 9/2002 | Kalandek | B60R 21/213 280/730.2 |
| 6,457,745 | B1 * | 10/2002 | Heigl | B60R 21/232 280/728.1 |
| 6,478,329 | B1 * | 11/2002 | Yokoyama | B60R 21/23138 280/729 |
| 6,561,541 | B2 | 5/2003 | Vendely et al. | |
| 7,063,351 | B2 | 6/2006 | Winkler | |
| 7,163,233 | B2 * | 1/2007 | Kino | B60R 21/232 280/730.2 |
| 8,366,145 | B2 | 2/2013 | Choi et al. | |

(Continued)

FOREIGN PATENT DOCUMENTS

| EP | 2767443 A1 | 8/2014 |
|---|---|---|
| JP | 4946932 B2 | 3/2012 |
| KR | 1020150094940 | 8/2015 |

OTHER PUBLICATIONS

Search Report from United Kingdom Intellectual Property Office dated Mar. 2, 2018 regarding GB Application No. 1716263.7 (4 pages).

*Primary Examiner* — Drew J Brown
(74) *Attorney, Agent, or Firm* — Frank A. MacKenzie; Bejin Bieneman PLC (57) ABSTRACT

A side air curtain includes an inner panel and an outer panel defining an inflation chamber. The inflation chamber is inflatable from an uninflated position to an inflated position. The side air curtain includes a tether attached to the inner panel and the outer panel. The tether includes at least one hole extending through the first tether and spaced from the inner panel and the outer panel.

20 Claims, 8 Drawing Sheets

(56) References Cited

U.S. PATENT DOCUMENTS

| | | | |
|---|---|---|---|
| 8,851,511 B1* | 10/2014 | Volkmann | B60R 21/23138 |
| | | | 280/730.2 |
| 2004/0183286 A1* | 9/2004 | Kino | B60R 21/232 |
| | | | 280/730.2 |
| 2004/0188988 A1* | 9/2004 | Wipasuramonton | B60R 21/214 |
| | | | 280/730.1 |
| 2006/0131847 A1* | 6/2006 | Sato | B60R 21/207 |
| | | | 280/730.2 |
| 2007/0001433 A1 | 1/2007 | Gu et al. | |
| 2007/0200321 A1 | 8/2007 | Heitplatz et al. | |
| 2011/0109070 A1* | 5/2011 | Tanaka | B60R 21/206 |
| | | | 280/741 |
| 2017/0113646 A1* | 4/2017 | Lee | B60R 21/2338 |

* cited by examiner

VEHICLE SIDE AIR CURTAIN WITH TETHER INCLUDING A HOLE

BACKGROUND

Vehicles can include passive occupant restraints, such as airbags and air curtains. One type of passive occupant restraint is a side air curtain. Side air curtains may be mounted to a frame of the vehicle above a passenger compartment. For example, the vehicle may include a headliner above the passenger compartment, and the side air curtain may be mounted above the headliner. When an impact event is sensed, the side air curtain may be inflated. When inflated, the side air curtain extends downwardly from the headliner and may extend along doors and/or side pillars of the vehicle to cushion impact between an occupant and the doors and/or side pillars.

Several research organizations release test protocols and standards for vehicles. For example, the Insurance Institute for Highway Safety (IIHS) releases a standard for head injury criterion (HIC) to assess head injury risk in vehicle impact tests. HIC is a measurement of the likelihood of a head injury based on linear impact of an occupant's head. The HIC measurement is benefited by low translational head acceleration.

In 2012, IIHS also released a standard to measure brain injury criterion (BrIC). The BrIC measurement is benefited from low rotation of the occupant's head. Rotation of the occupant's head can occur, e.g., from side impact events. The National Highway Traffic Safety Administration (NHTSA) is updating its New Car Assessment Program (NCAP) to include BrIC criteria in addition to its already existing HIC criteria.

The NHTSA's NCAP criteria for BrIC may result in competing design factors for side air curtains than its criteria for HIC.

DETAILED DESCRIPTION

Figure 1:
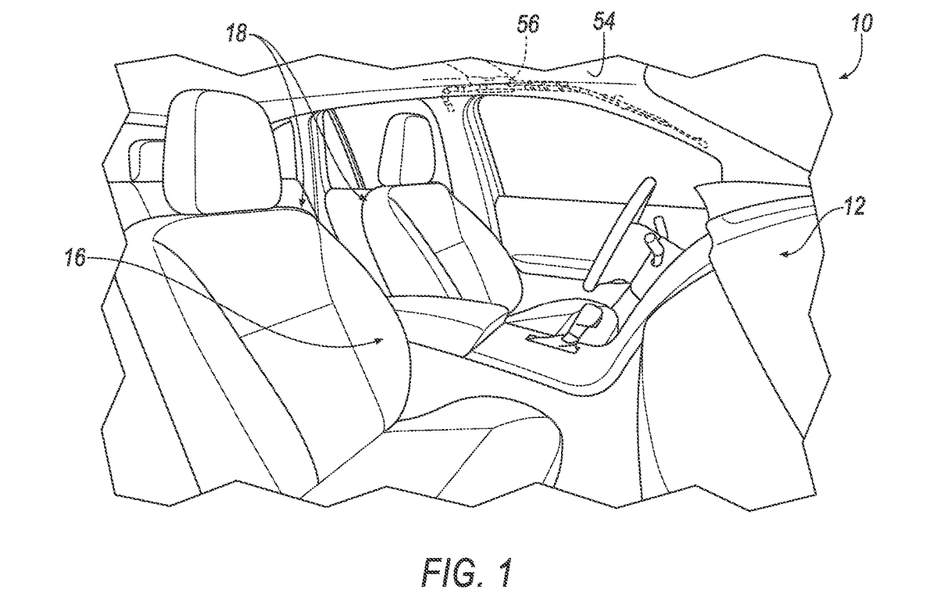
FIG. 1 is a perspective view of a passenger compartment of a vehicle with a side air curtain in an uninflated position.
Figure 2:
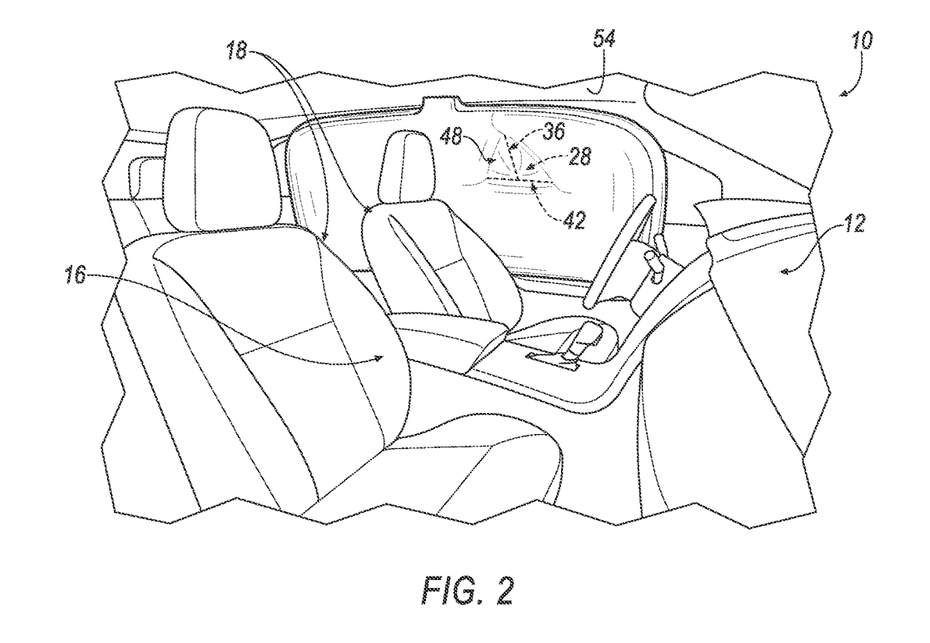
FIG. 2 is a perspective view of the passenger compartment of the vehicle from FIG. 1 with an example of a side air curtain in an inflated position.

With reference to the Figures, wherein like numerals indicate like parts throughout the several views, a vehicle 10 may include a side air curtain 20, 220. The side air curtain 20, 220 includes an outer panel 22 and an inner panel 24. The outer panel 22 and the inner panel 24 define an inflation chamber 26 therebetween. The inflation chamber 26 may be inflatable to inflate the side air curtain 20, 220 from an uninflated position as shown in FIG. 1, to an inflated position as shown in FIGS. 2-10. In the inflated position, the inner panel 24 of the side air curtain 20, 220 faces a passenger compartment 16 of the vehicle 10.

A tether 28, 228 is attached to the outer panel 22 and the inner panel 24 of the side air curtain 20, 220. The tether 28, 228 has a length from the outer panel 22 to the inner panel 24 that is greater than zero. The tether 28, 228 may include at least one hole 34 that extends through the tether 28, 228. The hole 34 is spaced from the outer panel 22 and the inner panel 24, and allows an inflation medium, e.g., gas, to flow through the tether 28, 228 in the inflation chamber 26. In this way, the at least one hole 34 can reduce disruption of the flow of the inflation medium through the inflation chamber 26 by the tether 28, 228.

One example of the side air curtain 20 shown in FIGS. 2-6 includes the tether 28. Another example of the side air curtain 220 shown in FIGS. 7-10 includes the tether 228. Common numerals are used to identify common features in the examples shown in FIGS. 2-6 and 7-10.

In the example of the side air curtain 20 illustrated in FIGS. 2-6, the tether 28 has a leg portion 36 and a base portion 42. When the side air curtain 20 is installed in the vehicle 10 and in the inflated position, the leg portion 36 extends in a substantially vertical direction. The base portion 42 extends in a substantially horizontal direction. Together, the leg and the base portions 36, 42 of the tether 28 may form an inverted T-shape.

Figure 3:
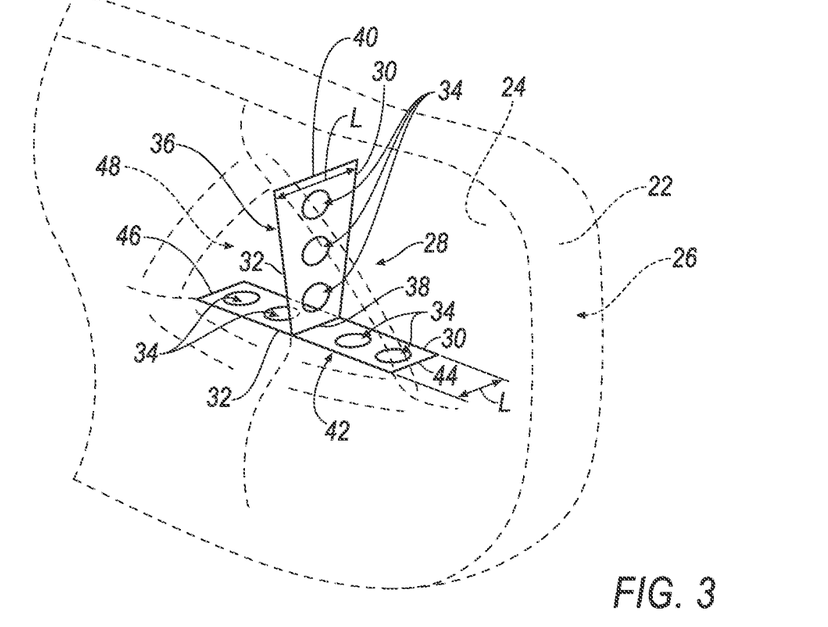
FIG. 3 is a perspective view of the side air curtain including an example of a tether with a portion of a side air curtain shown in hidden lines.
Figure 4:
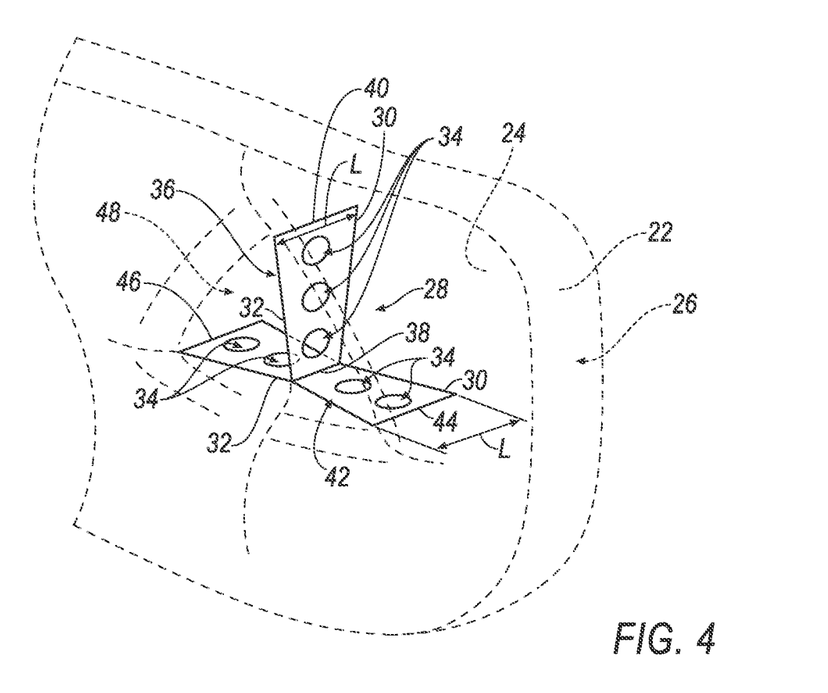
FIG. 4 is a perspective view of the side air curtain including another example of the tether with a portion of a side air curtain shown in hidden lines.
Figure 5:
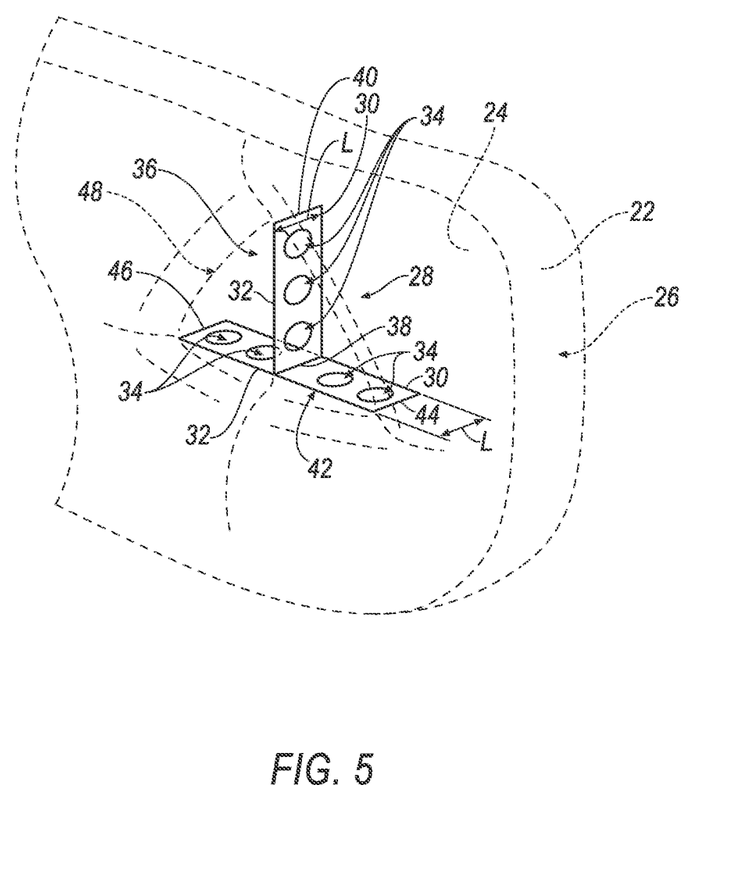
FIG. 5 is a perspective view of the side air curtain including another example of the tether with a portion of a side air curtain shown in hidden line.
Figure 6:
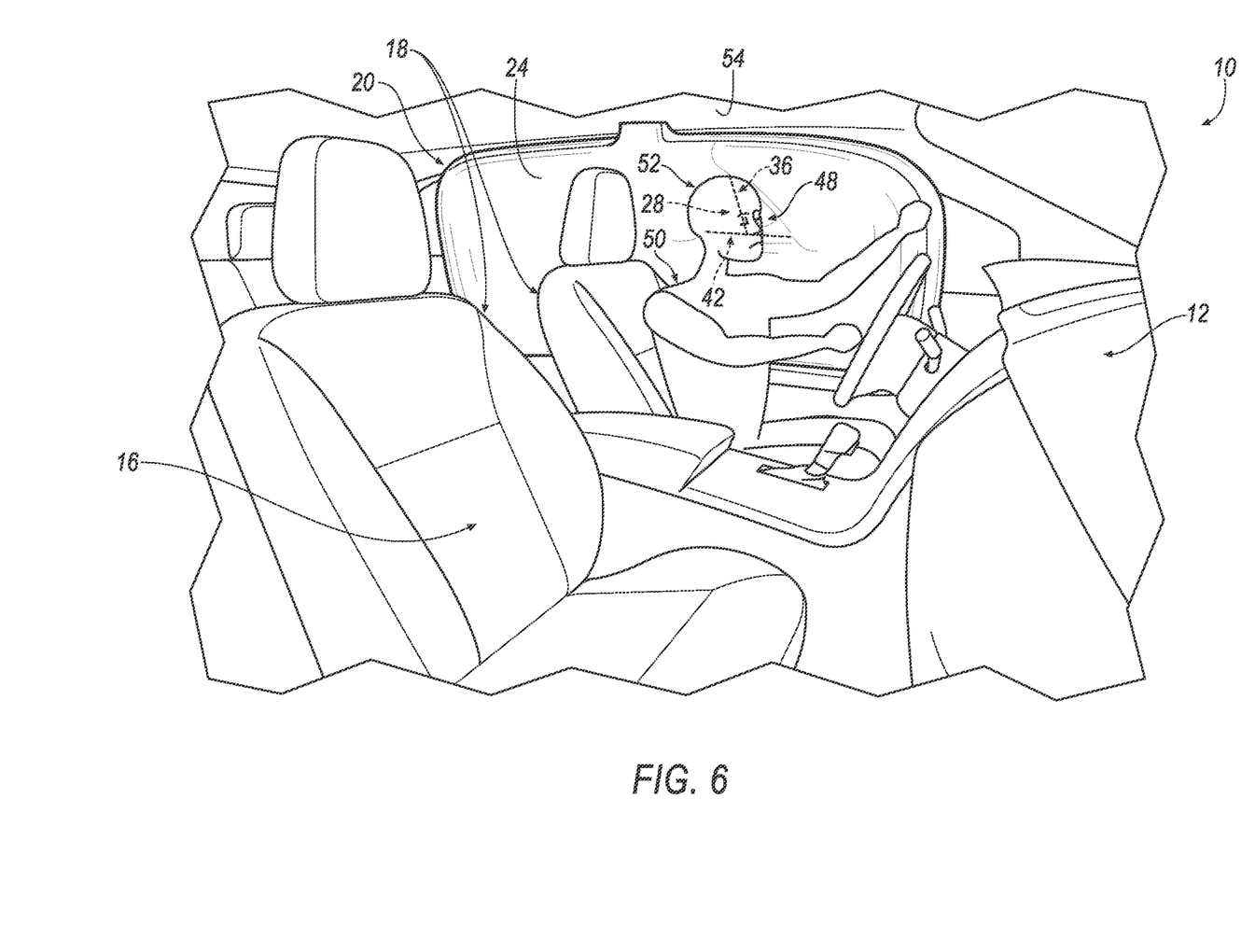
FIG. 6 is a perspective view of the passenger compartment of the vehicle from FIG. 1, with a side air curtain in an inflated position, and a head of an occupant moving toward the side air curtain.

The leg portion 36 includes a proximal end 38 and a distal end 40. The proximal end 38 of the leg portion 36 may contact the base portion 42, as shown in FIGS. 3-5. Alternatively, the leg portion 36 may be spaced from the base portion 42, i.e., the proximal end 38 of the leg portion 36 may be spaced from the base portion 42.

The distal end 40 of the leg portion 36 is located further from the base portion 42 relative to the proximal end 38 when the side air curtain 20 is installed in the vehicle 10 and in the inflated position. Referring to FIGS. 3 and 4, the leg portion 36 may taper between the distal end 40 and the proximal end 38 in a direction toward the proximal end 38.

For example, the taper of the leg portion 36 between the distal end 40 and the proximal end 38 can extend from the distal end 40 to the proximal end 38. The taper from the distal end 40 to the proximal end 38 may be constant.

Alternatively, as shown in FIG. 5, the leg portion 36 may not taper between the distal end 40 and the proximal end 38. In other words, lengths of the leg portion 36 from the outer panel 22 to the inner panel 24 of the side air curtain 20 may be substantially constant from the distal end 40 to the proximal end 38. In the examples of the tether 28 shown in FIGS. 2-6, the distal end 40 of the leg portion 36 of the tether 28 has a length that is greater than or substantially equal to a length of the proximal end 38.

The base portion 42 of the examples of the tether 28 shown in FIGS. 2-6 includes a vehicle-forward end 44 and a vehicle-rearward end 46. As discussed above, when the side air curtain 20 is installed in the vehicle 10 and in the inflated position, the base portion 42 extends in a substantially horizontal direction. The vehicle-forward end 44 of the base portion 46 is located in closer proximity to a front 12 of the vehicle 10 than the vehicle-rearward end 46.

Referring to FIGS. 3 and 5, lengths of the base portion 42 from the outer panel 22 to the inner panel 24 of the side air curtain 20 may be substantially constant from the vehicle-forward end 44 to the vehicle-rearward end 46. In other words, the base portion 42 may not taper between the vehicle-forward end 44 and the vehicle-rearward end 46.

Alternatively, the base portion 42 may taper between the vehicle-forward end 44 and the leg portion 36 in a direction of the leg portion 36 and/or may taper between the vehicle-rearward end 46 and the leg portion in a direction of the leg portion 36. As shown in FIG. 4, both the vehicle-forward and the vehicle-rearward ends 44, 46 of the leg portion 36 may taper from the vehicle-forward and the vehicle-rearward ends 44, 46 to the leg portion 44 in the direction of the leg portion 44. The tapers from the vehicle-forward end 44 to the leg portion 36 and the vehicle-rearward end 46 to the leg portion 36 may be constant.

As discussed above, the tether 28, 228 includes at least one hole 34 that extends through the tether 28, 228 and is spaced from the outer panel 22 and the inner panel 24. Each hole 34 is continuously bounded by the material of the tether 28, 228, e.g., by woven polymer, as discussed further below. Said differently, the material of the tether 28, 228, e.g., woven polymer, extends continuously around each hole 34.

In the example of the tether 28 shown in FIGS. 2-6, the leg portion 36 may include a plurality of holes 34 spaced from the outer panel 22 and the inner panel 24. The holes 34 can be spaced from each other between the proximal and the distal ends 38, 40 of the leg portion 36. For example, the holes 34 can be spaced from each other from the proximal end 38 to the distal end 40.

The base portion 42 may include a plurality of holes 34 spaced from the outer panel 22 and the inner panel 24. The holes 34 can be spaced from each other between the vehicle-forward and the vehicle-rearward ends 44, 46 of the base portion 42. The holes 34 may be spaced from each other along the base portion 42 from the vehicle-forward end 44 to the vehicle-rearward end 46 of the base portion 42.

As discussed above, the tether 28 is attached to the outer panel 22 and the inner panel 24 of the side air curtain 20. For example, a first side 30 of the tether 28 may be stitched to the outer panel 22, and a second side 32 of the tether 28 may be stitched to the inner panel 24. Alternatively, other means can be used for attaching the first and the second sides 30, 32 of the tether 28 to the outer panel 22 and the inner panel 24, respectively, such as adhesives, chemical welding, staples, and other suitable means.

In the example of the tether 28 in FIGS. 2-6, when the side air curtain 20 is installed in the vehicle 10 and in the inflated position, the tether 28 forms a depression 48 in the inner panel 24 of the side air curtain 20. In an impact event, e.g., a side impact, the side air curtain 20 can deploy from the uninflated to the inflated position, and align the depression 48 in the inner panel 24 with a head 52 of an occupant 50 in a vehicle seat 18 adjacent the side air curtain 20. In this way, if the head 52 of the occupant 50 contacts the depression 48, rotation of the head 52 may be reduced with no increase or limited increase in lateral acceleration of the head 52.

FIGS. 7-10 illustrate another example of the side air curtain 220. In this example, the side air curtain 220 includes the tether 228 and a second tether 238. The tether 228 and the second tether 238 are attached to the outer panel 22 and the inner panel 24 of the side air curtain 220.

The tether 228 and the second tether 238 have a length from the outer panel 22 to the inner panel 24 that is greater than zero. Moreover, each of the tether 228 and the second tether 238 include at least one hole 34 that extends through the tether 228 and the second tether 238.

The hole 34 is spaced from the outer panel 22 and the inner panel 24, and allows an inflation medium, e.g., gas, to flow through the tether 228 and the second tether 238 in the inflation chamber 26. In this way, the at least one hole 34 can reduce disruption of the flow of the inflation medium through the inflation chamber 26 by the tether 228 and the second tether 238.

The tether 228 and the second tether 238 may be attached to the outer and the inner panels 22, 24 in the manner described above with respect to the tether 28. For example, the tether 228 and the second tether 238 have first sides 230, 240 that may be stitched to the outer panel 22, and second sides 232, 242 that may be stitched to the inner panel 24. Other means may be used for attaching the tether 228 and the second tether 238 to the outer panel 22 and the inner panel 24, including adhesives, chemical welding, staples, and other suitable means.

As shown in FIGS. 7-10, when the side air curtain is installed in the vehicle 10 and in the inflated position, the tether 228 and the second tether 238 extend in a substantially vertical direction. Moreover, the tether 228 and the second tether 238 are in a substantially parallel arrangement relative to each other, with the tether 228 in a vehicle-forward position relative to the second tether 238. The tether 228 and the second tether 238 can be spaced from each other in a range of, e.g., 1 to 16 inches.

Figure 8:
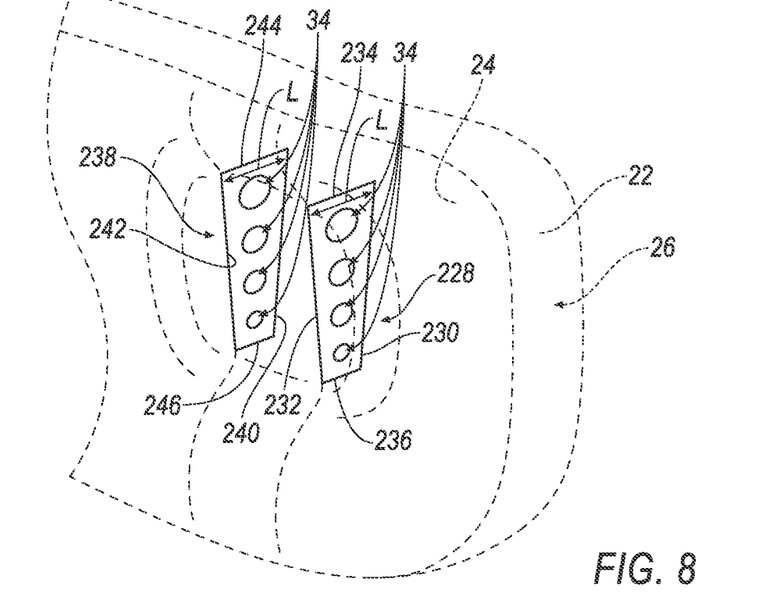
FIG. 8 is a perspective view of the side air curtain including an example of a tether and a second tether with a portion of a side air curtain shown in hidden lines.
Figure 9:
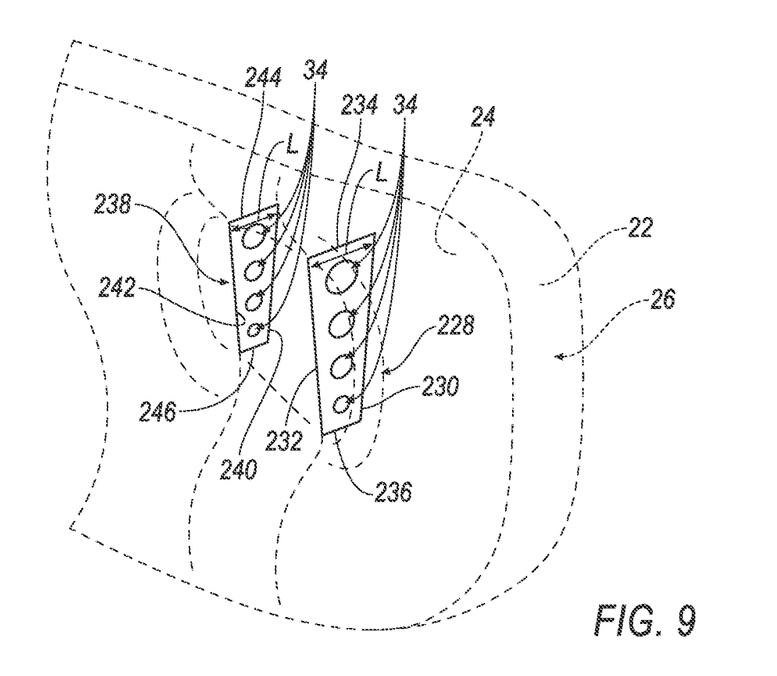
FIG. 9 is a perspective view of the side air curtain including another example of the tether and the second tether with a portion of a side air curtain shown in hidden lines.
Figure 10:
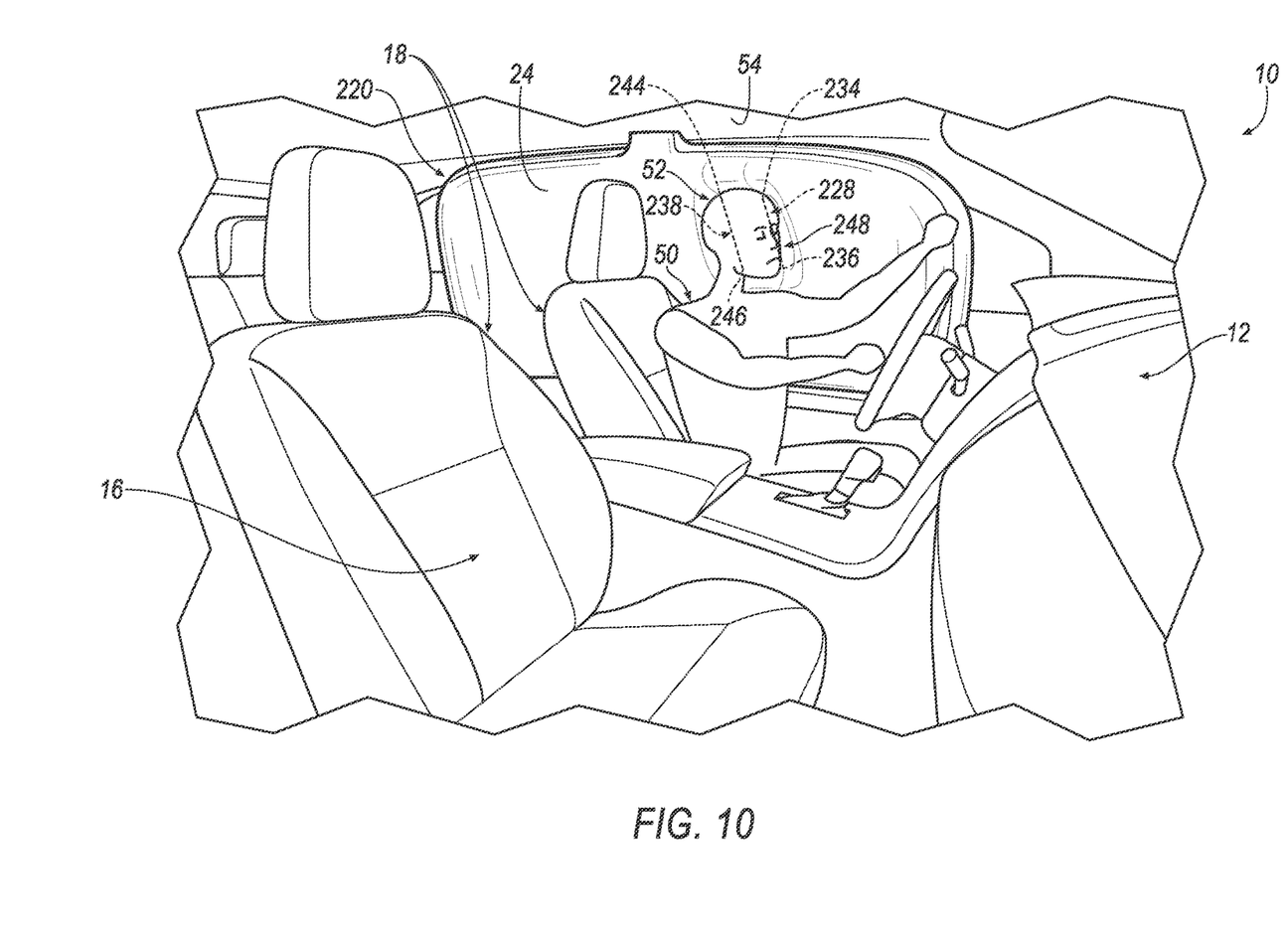
FIG. 10 is a perspective view of the passenger compartment of the vehicle from FIG. 7, with a side air curtain in an inflated position, and a head of an occupant moving toward the side air curtain.

The tether 228 includes a first end 234 and a second end 236. The first end 234 is in located in closer proximity to a roof (not shown) of the vehicle 10 relative to the second end 236 when the side air curtain 220 is installed in the vehicle 10 and in the inflated position. Referring to FIGS. 8 and 9, the tether 228 may taper between the first end 234 and the second end 236 in a direction of the second end 236.

For example, the taper of the tether 228 between the first end 234 and the second end 236 can extend from the first end 234 to the second end 236. The taper may be constant, as shown in FIGS. 8 and 9.

Figure 7:
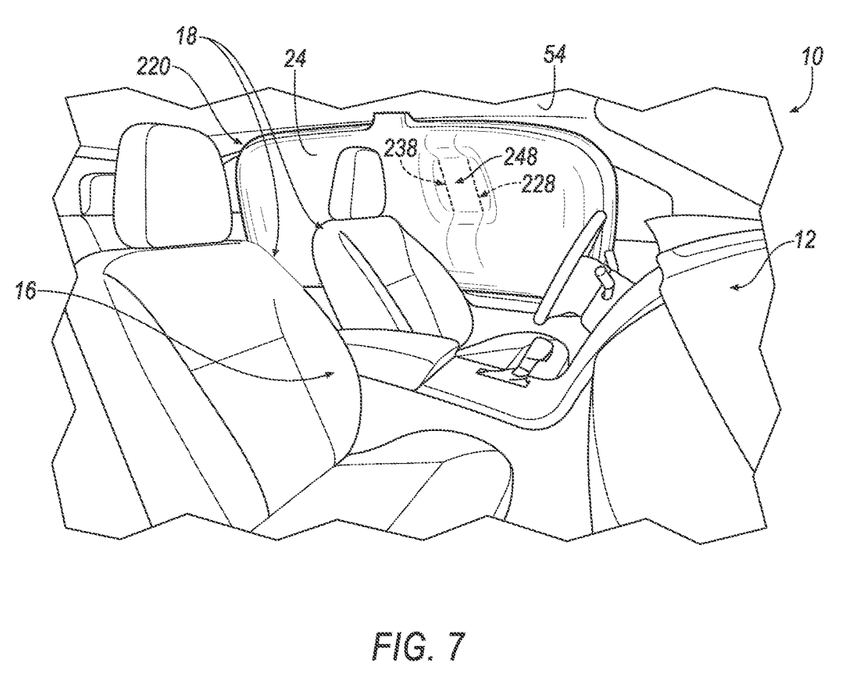
FIG. 7 is a perspective view of the passenger compartment of the vehicle with another example of a side air curtain in an inflated position.

With reference to FIGS. 7-9, the second tether 238 also includes a first end 244 and a second end 246, with the first end 244 located closer to the roof of the vehicle 10 when the side air curtain 220 is installed in the vehicle 10 and in the inflated position. The second tether 238 may taper between the first and the second ends 244, 246 in the direction of the second end 246. The taper of the second tether 238 can extend from the first end 244 to the second end 246, and may be constant.

As discussed above, the tether 228 and the second tether 238 have lengths from the outer panel 22 to the inner panel 24 that is greater than zero. As shown in FIG. 8, the tether 228 and the second tether 238 may have substantially equal lengths from their first ends 234, 244 to their second ends 236, 246. Alternatively, as shown in FIG. 9, the tether 228 may have greater lengths than the second tether 238, such that the length of the tether 228 at its second end 236 is greater than the length of the second tether 238 at its second end 246.

The tether 228 and the second tether 238 may each include a plurality of holes 34 spaced from the outer panel 22 and the inner panel 24. The holes 34 can be spaced from each other between the first ends 234, 244 and the second ends 236, 246 of the tether 228 and the second tether 238. The holes 34 may be spaced from each other along the tether 228 and the second tether 238 from their first ends 234, 244 to their second end 236, 246.

In the example of the tether 228 and second tether 238 in FIGS. 7-10, when the side air curtain 220 is installed in the vehicle 10 and in the inflated position, the tether 228 and the second tether 238 form a depression 248 in the inner panel 24 of the side air curtain 220. In an impact event, e.g., a side impact, the side air curtain 220 can deploy from the uninflated to the inflated position, and align the depression 248 in the inner panel 24 with the head 52 of the occupant 50 in the vehicle seat 18 adjacent the side air curtain 220. In this way, if the head 52 of the occupant 50 contacts the depression 248, rotation of the head 52 may be reduced with no increase or limited increase in lateral acceleration of the head 52.

The side air curtain 20, 220 may be formed of any suitable material, such as a woven polymer. For example, the inner panel 24, the outer panel 22, as well as the tether 28, 228 and second tether 238 can be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 11:
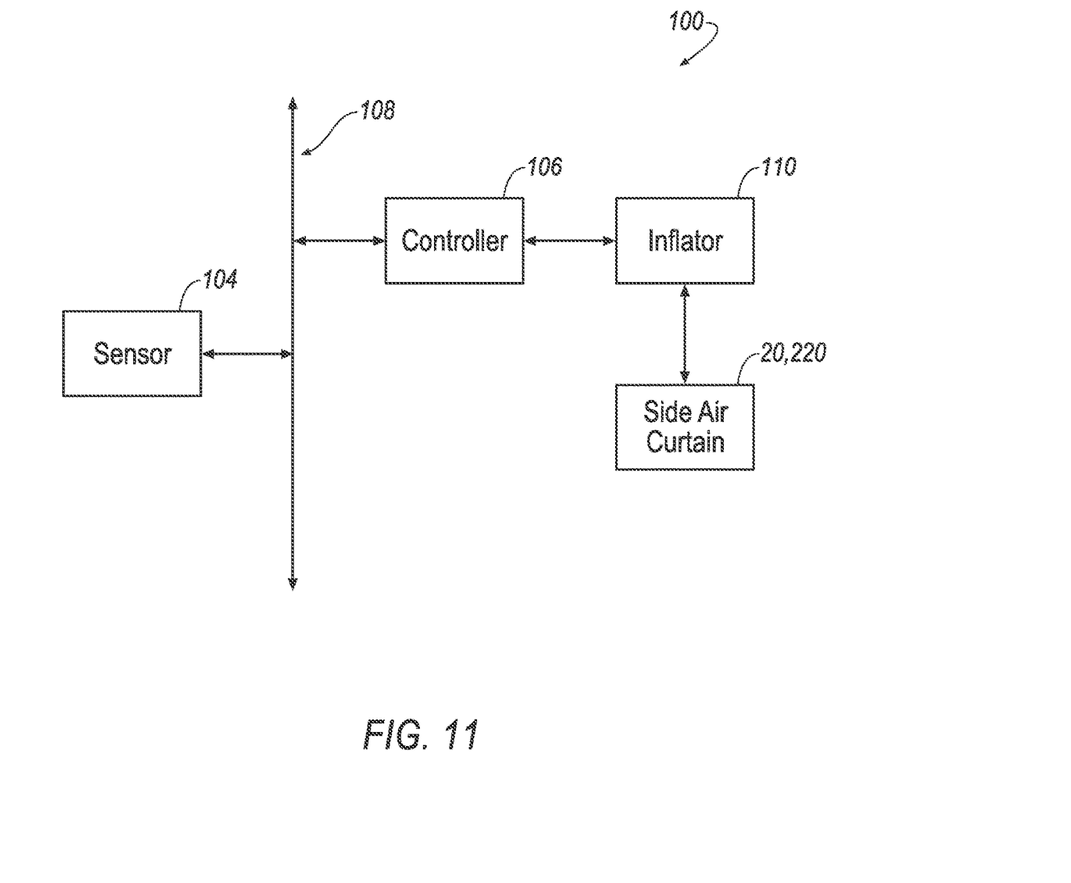
FIG. 11 is a schematic of a passive restraint system including the side air curtain.

The side air curtain 20, 220 may be a component of a passive restraint system 100, which is shown schematically in FIG. 11. The passive restraint system 100 includes an impact sensing system 102, which may include at least one impact sensor 104 for sensing impact of the vehicle 12. The impact sensor 104 is the only component of the impact sensing system 102 shown in FIG. 11. The impact sensing system 102 can include additional components not shown in FIG. 11.

The passive restraint system 100 may include a controller 106. The controller 106 and the sensor 104 may be connected to a communication bus 108, such as a controller area network (CAN) bus, of the vehicle 12. The controller 106 may use information from the communication bus 108 to control the activation of an inflator 110. The inflator 110 may be connected to the controller 106, as shown in FIG. 11, or may be connected directly to the communication bus 108.

The inflator 110 is in fluid communication with the side air curtain 20, 220, and expands the side air curtain 20, 220 with the inflation medium, such as gas. The inflator 110 may, for example, be a pyrotechnic inflator that uses a chemical reaction to drive inflation medium to the side air curtain 20, 220. More specifically, when the impact sensing system 102 activates the pyrotechnic inflator, a chemical reaction occurs causing a portion of the inflator 110 to burst, allowing the inflation medium to fill the side air curtain 20, 220. Alternatively, the inflator 110 may, for example, be a cold-gas inflator which, when activated, ignites a pyrotechnic charge that creates an opening for releasing the pressurized inflation medium to the side air curtain 20, 220 via a fill tube (not shown). The inflator 110 may be a cold-gas inflator. Alternatively, the inflator 26 may be of any suitable type, for example, a hybrid inflator.

With reference to FIG. 11, the controller 106 may be in communication with the sensor 104 and the inflator 110, directly or through the communication bus 108, for activating the inflator 110, e.g., for providing an impulse to a pyrotechnic charge of the inflator 110, when the sensor 104 senses an impact of the vehicle 12. Alternatively or additionally to sensing impact, the passive restraint system 100 may be configured to sense impact prior to impact, i.e., pre-impact sensing. The sensor 104 may be of any suitable type, e.g., using radar, lidar, and/or a vision system. The vision system may include one or more cameras, CCD image sensors, and/or CMOS image sensor, etc.

The controller 106 may be a microprocessor-based controller. The sensor 104 is in communication with the controller 106 to communicate data to the controller 106. Based on the data communicated by the sensor 104, the controller 106 may instruct the inflator 110 to activate.

In operation, in response to an impact sensed by the sensor 104, the controller 106 may provide an instruction to the inflator 110 to inflate the side air curtain 20, 220 from the uninflated position to the inflated position. As the side air curtain 20, 220 inflates to the inflated position, the side air curtain 20, 220 displaces a headliner 54 to extend downwardly into the passenger compartment 16 from a reaction surface 56, such as a roof beam, or any other suitable surface to which the side air curtain 20, 220 can be mounted.

As used herein, the adverb "substantially" modifying an adjective means that a shape, structure, measurement, etc. may deviate, e.g., +/−5% or any other suitable industry tolerance, from an exact described geometry, distance, measurement, etc., because of imperfections in materials, machining, manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. A side air curtain, comprising:
    an outer panel and an inner panel defining an inflation chamber therebetween, the inflation chamber being inflatable to an inflated position;
    a tether attached to the outer panel and the inner panel, the tether having a length from the outer panel to the inner panel in the inflated position;
    a hole extending through the tether and spaced from the outer panel and the inner panel; and
    wherein in the inflated position, the tether includes a base portion having a vehicle-forward end and a vehicle-rearward end, and a leg portion extending in a direction transverse to the base portion between the vehicle-forward end and the vehicle-rearward end.

2. The side air curtain of claim 1, wherein in the inflated position, the leg portion has a distal end spaced from the base portion, and the leg portion tapers between the distal end and the base portion in a direction toward the base portion.

3. The side air curtain of claim 1, wherein in the inflated position, the base portion has a vehicle-forward end and a vehicle-rearward end, and the vehicle-forward end tapers between the vehicle-forward end and the leg portion in a direction toward the leg portion, and the vehicle-rearward end tapers between the vehicle rearward end and the leg portion in a direction toward the leg portion.

4. The side air curtain of claim 1, wherein the leg portion has a plurality of holes extending through the leg portion and spaced from the outer panel and the inner panel, and the base portion has a plurality of holes extending through the base portion and spaced from the outer panel and the inner panel.

5. The side air curtain of claim 1, further comprising a second tether attached to the outer panel and the inner panel, the second tether having a length from the outer panel to the inner panel, the tether and the second tether are substantially parallel to each other in the inflated position.

6. The side air curtain of claim 5, wherein the tether and the second tether each have first ends spaced from each other and second ends adjacent each other, the tether and the second tether each taper between the respective first end and second end in a direction toward the second end in the inflated position.

7. The side air curtain of claim 6, wherein a length of the tether is greater than a length of the second tether in the inflated position.

8. The side air curtain of claim 5, wherein the tether has a plurality of holes extending through the tether and spaced from the outer panel and the inner panel, and the second tether has a plurality of holes extending through the second tether and spaced from the outer panel and inner panel.

9. A vehicle, comprising:
a reaction surface; and
a side air curtain supported by the reaction surface, the side air curtain including an outer panel and an inner panel defining an inflation chamber therebetween, the inflation chamber being inflatable to an inflated position;
the side air curtain including a tether attached to the outer panel and the inner panel, the tether having a length from the outer panel to the inner panel in the inflated position;
a hole extending through the tether and spaced from the outer panel and the inner panel; and
wherein in the inflated position, the tether includes a base portion extending in a vehicle fore-aft direction and a leg portion extending in a direction transverse to the base portion toward the reaction surface.

10. The vehicle of claim 9, wherein the side air curtain includes a depression in the inner panel formed by the tether in the inflated position.

11. The vehicle of claim 10, wherein the depression is designed to be aligned with a head of an occupant in the inflated position.

12. The vehicle of claim 9, wherein in the inflated position, the leg portion has a distal end spaced from the base portion between the base portion and the reaction surface, and the leg portion tapers between the distal end and the base portion in a direction toward the base portion.

13. The vehicle of claim 9, wherein in the inflated position, the base portion has a vehicle-forward end and a vehicle-rearward end, and the base portion tapers between the vehicle-forward end and the leg portion in a direction toward the leg portion, and the base portion tapers between the vehicle-rearward end and the leg portion in a direction toward the leg portion.

14. The vehicle of claim 9, wherein the leg portion has a plurality of holes extending through the leg portion and spaced from the outer panel and the inner panel, and the base portion has a plurality of holes extending through the base portion and spaced from the outer panel and the inner panel.

15. The vehicle of claim 9 further comprising a second tether attached to the outer panel and the inner panel and spaced from the tether in a vehicle-rearward direction, the second tether having a length from the outer panel to the inner panel in the inflated position.

16. The vehicle of claim 15, wherein the tether and the second tether are substantially parallel to each other in the inflated position.

17. The vehicle of claim 16, wherein the tether and the second tether each have first ends spaced from each other and second ends adjacent each other, the first ends being spaced above the second ends in the inflated position, the tether and the second tether each taper between the respective first end and second end in a direction toward the second end in the inflated position.

18. The side air curtain of claim 15, wherein a length of the tether is greater than a length of the second tether in the inflated position.

19. A side air curtain, comprising:
an outer panel and an inner panel defining an inflation chamber therebetween, the inflation chamber being inflatable to an inflated position;
a first tether attached to the outer panel and the inner panel, the first tether having a length from the outer panel to the inner panel in the inflated position;
a second tether attached to the outer panel and inner panel, the second tether having a length from the outer panel to the inner panel, the first tether and the second tether substantially parallel to each other in the inflated position, the first tether and the second tether each having first ends spaced from each other and second ends adjacent each other, the first tether and the second tether each tapering between the respective first end and second end in a direction toward the second end in the inflated position; and
a hole extending through the first tether, the hole spaced from the outer panel and the inner panel.

20. The side air curtain of claim 19, wherein a length of the first tether is greater than a length of the second tether in the inflated position.

* * * * *